July 27, 1954
C. W. VOGT
2,684,613
APPARATUS FOR AND METHOD OF COMBINING ENWRAPMENTS
Filed Dec. 10, 1948
3 Sheets-Sheet 1
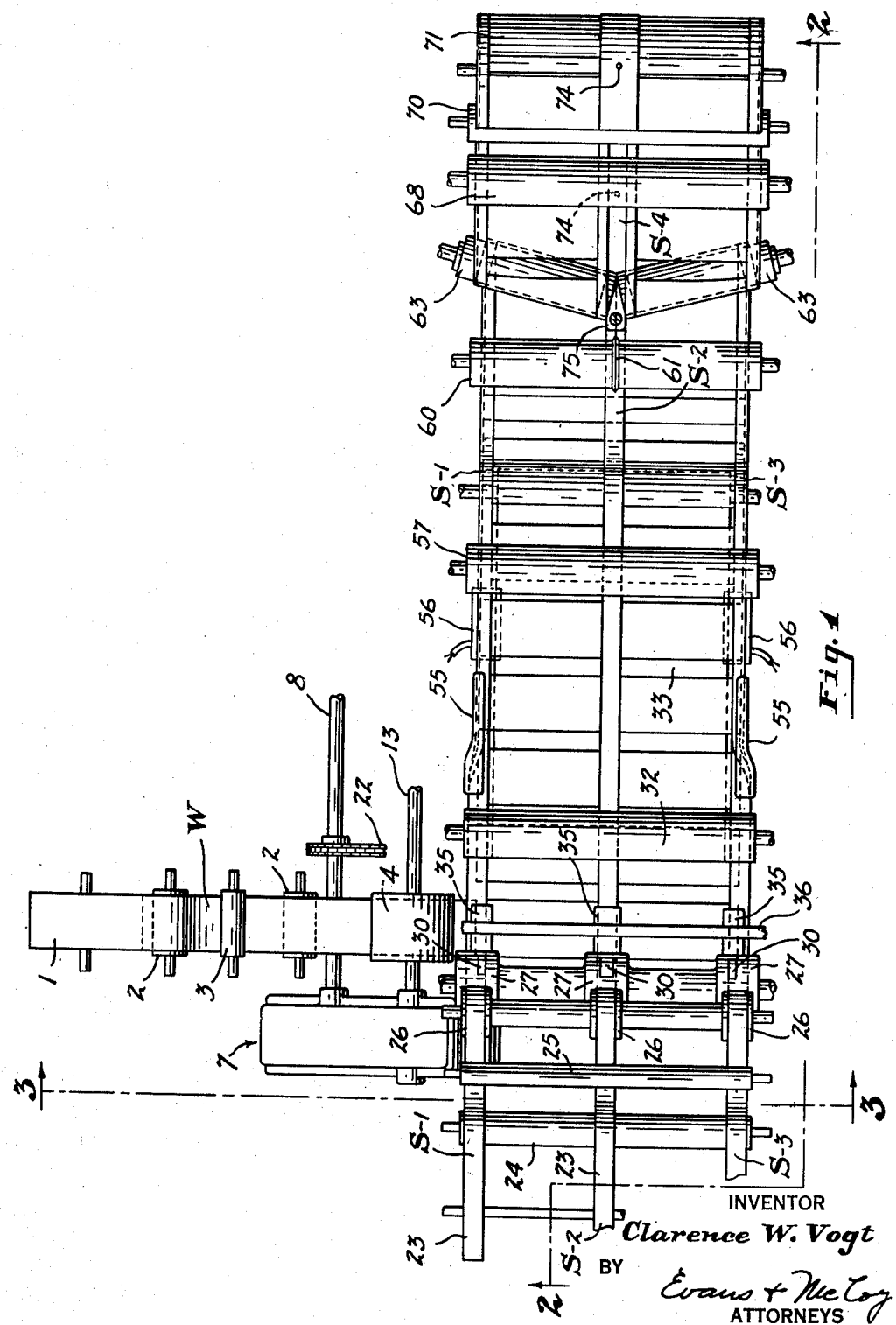
INVENTOR
Clarence W. Vogt
BY
Evans + McCoy
ATTORNEYS July 27, 1954 C. W. VOGT 2,684,613
APPARATUS FOR AND METHOD OF COMBINING ENWRAPMENTS
Filed Dec. 10, 1948 3 Sheets-Sheet 2
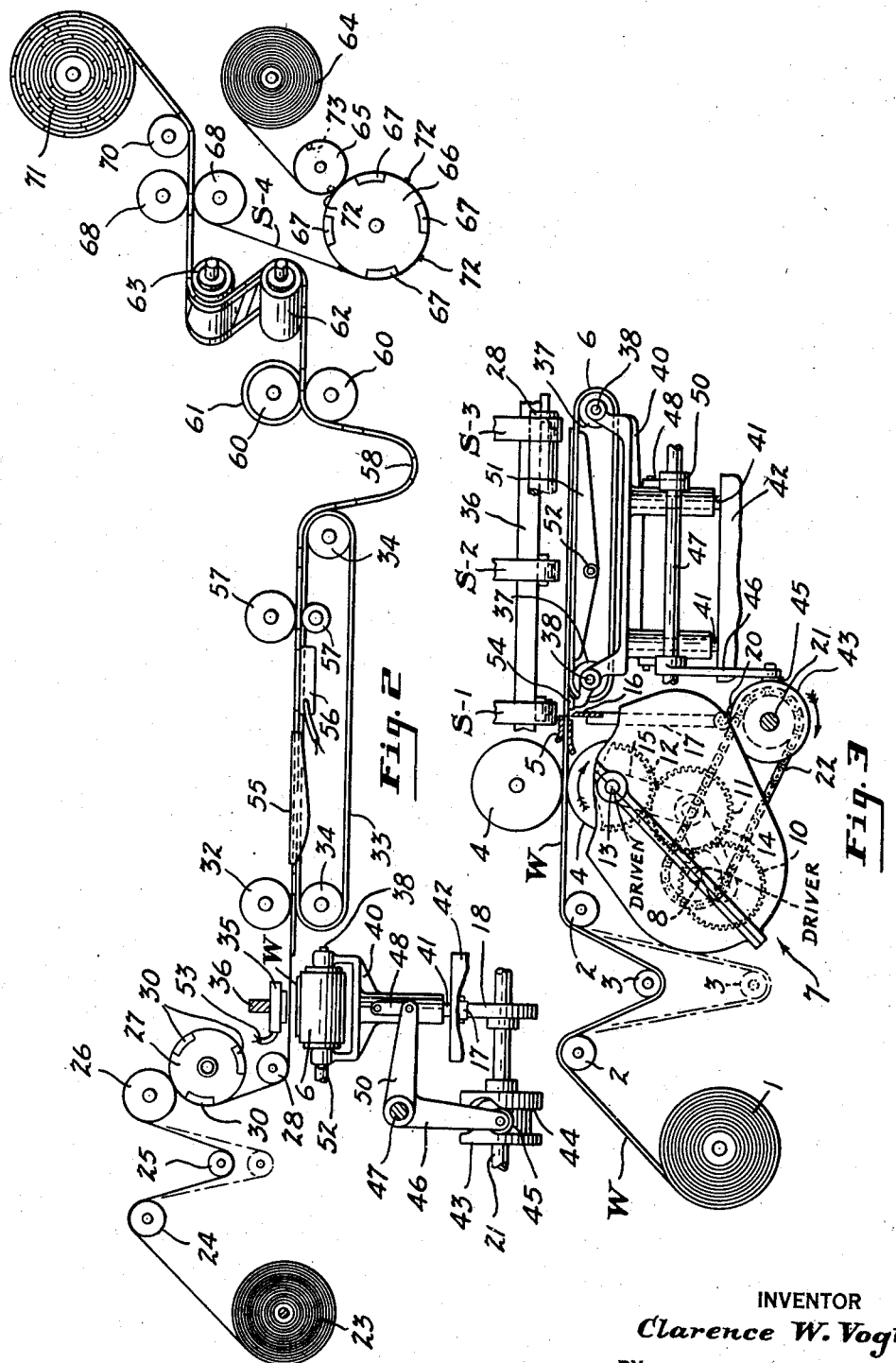
INVENTOR
Clarence W. Vogt
BY Evans + McCoy
ATTORNEYS July 27, 1954   C. W. VOGT   2,684,613
APPARATUS FOR AND METHOD OF COMBINING ENWRAPMENTS
Filed Dec. 10, 1948   3 Sheets-Sheet 3
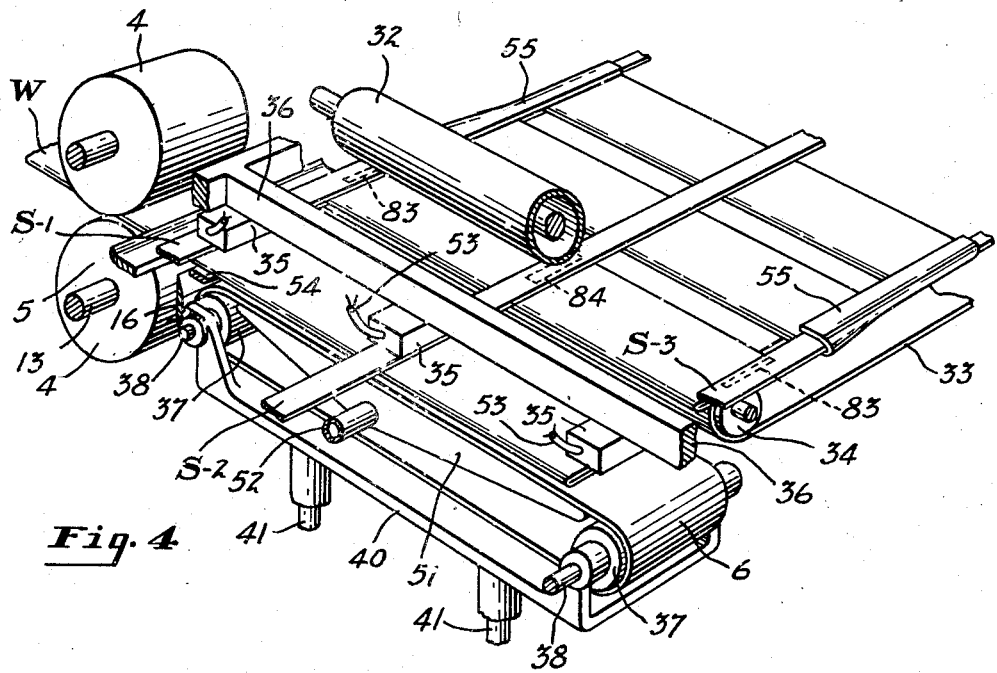
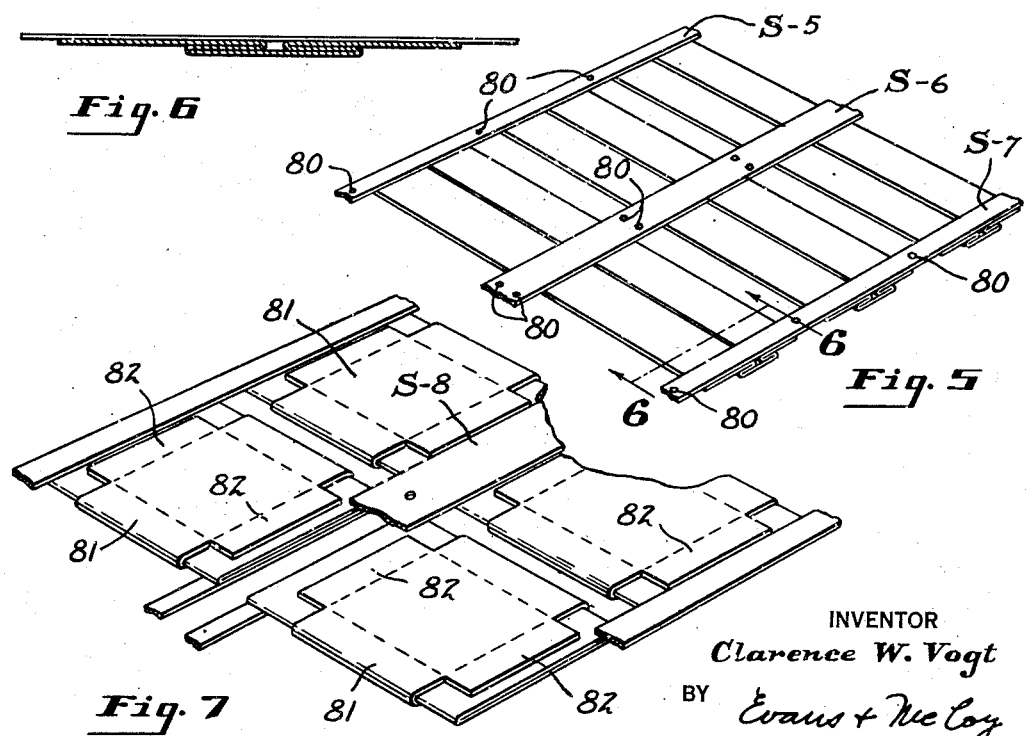
INVENTOR
Clarence W. Vogt
BY Evans + McCoy
ATTORNEYS Patented July 27, 1954

2,684,613

UNITED STATES PATENT OFFICE 2,684,613

APPARATUS FOR AND METHOD OF COMBINING ENWRAPMENTS

Clarence W. Vogt, Norwalk, Conn.

Application December 10, 1948, Serial No. 64,666

12 Claims. (Cl. 93—1)

This invention relates to an apparatus for and a method of combining enclosures or enwrapments into a series or chain.

In the past, the utilization of enwrapments, such as, for example bags, has been complicated and made more expensive due to the necessity for individually and generally manually handling the individual enwrapments while feeding them to or during the packaging operations.

It is therefore a primary object of the present invention to provide an apparatus for and method of assembling enwrapments into one or more chains or series to assist or facilitate the feeding, advancing, filling, opening, closing, positioning, sealing, or other handling of the enwrapments during their use in packaging.

Another object is to provide an apparatus for and a method of combining enwrapments into a series or chain whereby the enwrapments may be more readily transported or shipped from their place of fabrication to the point where they are to be used.

A further object is to provide an apparatus for and method of assembling enwrapments into a series or chain to facilitate the handling of the individual enwrapments which includes combining enwrapments by detachably securing the enwrapments into a series or chain such that the individual enwrapments may be separated from the series or chain at a desired point.

Another object is to provide an apparatus for and method of assembling enwrapments in which partial formation or completion of the enwrapments to a condition ready for use may be carried on as a part of or in conjunction with the assembling or chaining operations.

A further object is to provide apparatus for and method of assembling enwrapments into a chain or connected series by the use of chaining means which may be used to form a part of the completed enwrapment after packaging therein has been carried out. For example, where the enwrapment is a bag which may be chained by an elongated strip, such elongated strip material may, if desired, be utilized in conjunction with the completed package as a reinforcing or a sealing strip.

A still further object of the present invention is to provide an apparatus for and method of assembling enwrapments to form double or multiple chains of enwrapments to permit the handling of a plurality of enwrapments simultaneously during the combining or assembling operations or while the enwrapments are being utilized for packaging.

Another object is to provide an apparatus for and method of assembling enwrapments in which connected multiple enwrapments may be combined into a series or chain of multiple enwrapments and subsequently the connection between enwrapments may be severed to permit separate handling of the chains of individual enwrapments or positioning of the chains of individual enwrapments with respect to each other.

A further object is to provide an apparatus for and method of assembling enwrapments into a chain or series in which the enwrapments are advanced to an assembly point where they may temporarily hesitate or dwell at which time the enwrapments may be secured to the chaining means.

Other objects and advantages will become apparent from the following detailed description accompanied by the drawings in which:

Figure 1 is a plan view in semi-diagrammatic form of apparatus which may be used to carry out the present invention;

Fig. 2 is a diagrammatic side elevation of the apparatus shown in Fig. 1, taken substantially on line 2—2 of Fig. 1 and illustrating the path of the chaining means;

Fig. 3 is a diagrammatic side elevation of the apparatus shown in Fig. 1 taken substantially on line 3—3 of Fig. 1 to illustrate a portion of the path of the enwrapments;

Fig. 4 is an enlarged fragmentary perspective view of the assembly point to illustrate the securing of the enwrapments and the chaining means;

Fig. 5 is a fragmentary perspective view of a modified form of chain or series of enwrapments or wrappers which may be made on the apparatus shown in Figs. 1 through 4;

Fig. 6 is an enlarged sectional view taken substantially on line 6—6 of Fig. 5 showing details of the chain or series shown in Fig. 5; and Fig. 7 is another perspective view of an additional modified form of enwrapment which may be made by the apparatus shown in Figs. 1 through 4 in accordance with the present invention.

This application is a continuation in part of my copending applications, Serial No. 41,384 filed July 29, 1948, now Patent No. 2,626,544, and entitled Apparatus for and Process of Manufacturing Enwrapments, and Serial No. 30,647 filed June 2, 1948, now Patent No. 2,628,013. and entitled Method of and Article for Packaging Materials.

For the purpose of this application, the term

"enwrapment" is intended to mean almost any form of collapsible, flexible or partially flexible enclosure, whether or not completely fabricated and ready for use in packaging, such as, for example, an envelope, a bag, a wrapper, a carton, a bag or liner in conjunction with a protective carton or frame, etc. The term "chaining means" shall be construed to include a plurality of individual elements or one or more continuous elements serving to connect individual enwrapments into a single or multiple chain or series.

In the embodiment of the invention shown in the drawings enwrapments, or one or more elements thereof, are fed in the form of a continuous web to an assembly point while the plane of the web is horizontally disposed. At the same time the chaining means are fed in a path perpendicular to the path of the web of enwrapments to a position adjacent the assembly point. At the assembly point one or more of the enwrapments may be severed from the web, secured to the chaining means and removed from the assembly point. This operation is repeated so that the chaining means carry enwrapments which are secured thereto as a series. The spacing of the enwrapments may be varied as desired according to the circumstances under which the enwrapments are to be used.

Feeding enwrapments

It may be seen from Figs. 1, 3, and 4 that the enwrapments being assembled in the form of the invention shown, comprise a tubing which may be of any suitable material such as, for example, paper or one of the plastic films which is adaptable to packaging of commodities. Many of these new plastic films are extruded in the form of tubing and when collapsed are supplied in rolled form. Due to the characteristics of these plastics the films which they form are thin and quite flexible although they may possess high strength characteristics. This only means that they are generally more difficult to handle than packaging materials which may possess greater rigidity, such as the various types of paper.

The numeral 1 indicates a supply roll of suitable tubing from which a web W may be withdrawn. The web W passes over a pair of spaced guide rolls 2 and may be festooned between the guide rolls by a slack take-up roller 3. The web W then passes between a pair of driven feed rolls 4 under a guide strip and shear plate 5 and onto a belt conveyor 6.

The feed rolls 4 may be driven in any suitable manner. It is believed preferable, however, that they be driven so that they have an intermittent rotary motion, that is, during a portion of their rotation they will accelerate and during another portion of their rotation they will decelerate to a point such that there will be a perceptible dwell or hesitation in their rotary article-advancing cycle. Such a rotary drive may be obtained by the use of a gear train indicated in Figs. 1 and 3 by the numeral 7.

This gear train comprises a driving shaft 8 which may be powered by any suitable source of power (not shown). Eccentrically mounted on the shaft 8 is a gear 10. The gear 10 meshes with and drives an intermediate gear 11 which gear 11 in turn meshes with and drives a gear 12 which is mounted for rotation on the driven shaft 13. The gear 10 is also connected to the gear 11 by a link 14 pivotally mounted at its ends to the concentric centers of the gears 10 and 11. Similarly, the gears 11 and 12 are connected by a link 15 pivotally mounted at its ends to the concentric centers of the gears 11 and 12 which concentric centers also correspond to the axes of rotation of these gears. The effect of this gear train is to provide an intermittent motion of the driven shaft 13 although the driving shaft is continuously rotated at a constant speed. The driven shaft will rotate at a speed greater than the driving shaft for a portion of its rotary cycle but will also rotate at a decreased speed for a portion of its rotary cycle, such decreased speed in effect constituting a hesitation or dwell in the rotation of the driven shaft. The dwell may constitute approximately 60° of each complete revolution of the driven shaft. Since the gears 10, 11 and 12 are of the same size and always in mesh, the driven shaft 13 will make a complete revolution for each revolution of the driving shaft 8.

Accordingly the feed rolls 4 will be activated by the driven shaft 13 to withdraw and advance a length of the web W therebetween and onto the belt conveyor 6 for a portion of their rotary motion, and will then temporarily cease feeding while other operations may be carried out. Fig. 3 indicates the feed rolls 4 in that position of their cycle where they have recently ceased feeding web W onto the conveyor 6 and have begun their dwell period. At this point a knife 16 mounted for reciprocation on a push rod 17 (see Fig. 3) is activated to move upwardly and sever a length of tubing or tubular casing from the web W with the cooperation of the shear plate 5. The push rod 17 is activated by a cam 18 having a projection 20 at the proper point on the circumference on the cam. The cam 18 is mounted for rotation on a shaft 21 and the shaft 21 is driven by a chain 22 which chain is entrained around sprockets on the shaft 21 and on the drive shaft 8. Since the shaft 21 is powered by the driving shaft 8 it is driven at a constant driving speed.

At this point in the operation a length of tubing has been severed and deposited on the conveyor belt 6 and is ready for assembly with the chaining means.

Feeding the chaining means

The drawings illustrate the chaining means used to assemble enwrapments into a series as a plurality of elongated strips which may be adhesively coated with a suitable thermoplastic adhesive at the desired areas to permit adhering the enwrapments to the chaining means. It will be obvious that the chaining means may also comprise one or more discontinuous elements suitable to assemble the enwrapments into a chain or series. Further, many other methods of securing the chaining means to the enwrapments may be utilized.

Figs. 1 and 2 best illustrate the advancing of the chaining means to a location adjacent the point of assembly with the enwrapment. Preferably the elongated strip material is withdrawn from supply rolls 23 and Fig. 1 indicates three such supply rolls from which elongated strips S1, S-2 and S-3 may be withdrawn. The elongated strips then pass over a guide roller 24, under a slack roller 25 and over and partially around three rollers 26 which cooperate with three large diameter rollers 27 to act as feed rolls and advance the strips S-1, S-2 and S-3. The rolls 26 and 27 are shown as mounted on common shafts and are driven in any suitable manner (not shown) from the driven shaft 13 of the gear train 7 so that they will advance the tape in an intermittent rotary cycle corresponding to the advancement of the web W by the feed rolls 4. The elongated strips pass partially around the periphery of the rolls 27 and thence under a guide roll 28 from which they are directed to overlie the cut length of tubing on the conveyor belt 6.

As the elongated strips or tapes S–1, S–2, and S–3 travel around the periphery of the rolls 27 a thermoplastic adhesive coating thereon may be activated by heated sections indicated by the numeral 30 in Fig. 2 and suitably situated around the circumference of the rolls 27. In addition, while passing between the bight of the rolls 26 and 27, some or all of the elongated strips or tapes may, if desired, be scored to facilitate folding of the elongated strips for a purpose to be described later.

*Assembly*

The elongated strips or tapes may be supported at the assembly point by extending between the guide roller 28 and a feed roller 32 which engages a belt conveyor 33 carried on pulleys or rollers 34 to remove the elongated strips and assembled enwrapments from the delivery point. In this position the elongated strips or tapes S–1, S–2 and S–3 are disposed in a substantially horizontal plane spaced from and overlying a length of tubing disposed on the belt conveyor 6. The adhesively coated surfaces of the strips face downwardly while the upper surface of the strips may be supported against fixed members 35 rigidly held in place by a frame member 36.

To accomplish the securing together of the chaining means and the enwrapments it is only necessary to bring the enwrapments into engagement with activated areas of the adhesive on the elongated strips and as may best be seen in Figs. 2 and 4 this may be done by raising the belt conveyor 6 and the length of tubing thereon to contact the strips and press the tubing and strips against the members 35 so that they will be firmly secured together.

The belt conveyor 6 is entrained about pulleys 37 which are mounted on and carried by shafts 39. These shafts are journaled in arms extending from a carriage member 40. The carriage member 40 is provided with dependent portions which are apertured to receive pins 41 carried by a stationary portion 42 of the frame so that the carriage may reciprocate by sliding on the pins 41. To activate the carriage member 40, the shaft 21 carried a cylinder cam 43 provided with a groove or track 44 to receive a follower 45. The follower 45 is carried by a bellcrank 46 pivotally mounted on an oscillating shaft 47. The free arm of the bellcrank 46, opposite from the arm carrying the follower 45, is pivotally mounted to the carriage through an intervening link 48. The shaft 47 is also provided with an additional oscillating lever arm 50 which is also pivotally connected to the carriage member by an intermediate link 49 so that the reciprocation of the carriage is even. Upon activation by the cam 43 and the bellcrank 46 the carriage 40 raises vertically upwardly and moves the cut length of tubing into engagement with the elongated strips S–1, S–2 and S–3 so that the cut length of tubing will adhere to the strips.

When the enwrapment being handled is relatively flexible and light, it may be desirable to assist it in staying in place as it is being fed onto the belt conveyor 6 by the feed rolls 4. To accomplish this result, Figs. 3 and 4 show a vacuum box 51 disposed beneath the belt conveyor 6 with a pipe or tube 52 leading therefrom so that air may be exhausted from the vacuum box 51 by any suitable mechanism (not shown). The top surface of the vacuum box 51 may be slotted or apertured, or may be provided with any suitable foraminous covering to facilitate exhaustion of air through the belt 6 which may also be of a suitably porous material. The amount of the vacuum should be merely sufficient to hold the enwrapment flat on the surface of the belt 6 as it is being advanced therealong without interfering with its advancement.

In the event that the thermoplastic adhesive coating on the elongated strips will not remain tacky during its travel from the heated rollers 27 to the assembly point, it may be desirable that the members 35 carried by the frame 36, which act as backup members while the tubing is being pressed against the tapes, be provided with heater elements to activate the adhesive on the strips at the assembly point. The members 35 may be heated in any desirable manner, such as by electricity from any suitable source of current (not shown) carried to resistance heater elements in the members 35 through wires 53. Due to the action of the gear train 7 and the dwell provided thereby, the tapes S–1, S–2 and S–3 will rest against the members 35 and provide a time period during which the adhesive coating on the tapes may be activated.

Mounting on the carriage and closely adjacent to the cutter or knife 16 is a guide plate 54 which supports the cut length of tubing adjacent its severed edge and guides the enwrapment while it is traveling onto the conveyor 6. Further, when the carriage is reciprocated this plate 54 presses the end portion of the cut length of tubing against the elongated strip or tape S–1 (see Fig. 3).

*Removal of chain and subsequent operations*

The feed roll 32 in cooperation with the belt conveyor 33 removes the elongated strips S–1, S–2 and S–3, and the enwrapments secured thereto from the assembly point and advances them through the apparatus where further operations may be accomplished. The feed roll 32 and the pulleys 34 which carry the belt 33 are preferably activated from the driven shaft 13 of the gear train 7 so that they have an intermittent rotary cycle.

It will be noted from Fig. 3 that the disposition of the elongated strips S–1, S–2 and S–3 with respect to the cut lengths of tubing are such that the strips extend transversely and strip S–2 has its center line aligned with the midpoint of the cut length of tubing. The strips S–1 and S–3 are disposed at the end portions of the cut length of tubing with the edges of the tubing disposed approximately at the midpoints of the strips or tapes. This leaves a portion of the strips S–1 and S–3 extending beyond the cut length of tubing.

As the strips S–1 and S–3 leave the feed roll 32 they pass through creasers or folders 55 which fold the strips S–1 and S–3 along their center line and form a channel shaped tape which embraces the ends of the cut length of tubing. The enclosed tubing ends then pass over heaters 56 disposed along the edges of the belt 33. The heaters 56 are preferably disposed so that the cut length of tubing is in register therewith during its dwell period in the rotary cycle and may be stationary or may be mounted so that they move into engagement with each length of tubing as it passes thereover. The heating of the ends of the tubing with the channel shaped elongated strip disposed there-around will activate the thermoplastic coating which is disposed on the interior surface of the strips and thus will seal the end portions of the tubing. If the tubing is made of heat sealable material the heating afforded by the heaters 56 may also be used to autogenously weld the tubing walls together at their end edges. From the heaters the edges of the chain pass through a pair of rollers 57 which may be provided with rings of slightly larger diameter than the balance of the rollers at the locations of the ends of the cut length of tubing to squeeze and securely seal the tubing ends.

After passing through the squeeze rollers 57 the chain travels over the end of the conveyor 33 and is disposed in a festoon indicated by the numeral 58 in Fig. 2, following which it is engaged by a pair of feed rollers 60. The feed rollers 60 may be activated from the main drive shaft 8 of the machine which as previously described, rotates at a continuous speed. At the center line of the upper one of the feed rollers 60 a rotary cutter or slitter 61 may be provided to bisect the cut lengths of tubing and the strip or tape S-2 secured along their center lines as they pass through the feed rolls 60.

The bisected halves of the chain may then pass under a pair of spreading rolls 62 which are disposed at equal opposite angles with respect to the path of the chains as they approach the rolls 62. The chains pass under and partially around the spreading rolls 62 and are separated by an amount corresponding to the angular setting of the rolls with the angles of incidence and the angles of reflection of the approaching and departing chains being equal to obviate sidewise movement or slippage of the chains along the rolls. To assist in preventing the chains from leaving the rolls 62, a suitably shaped guide shoe 75 (see Fig. 1) may be interposed between the ends of the rolls 62, extending alongside the ends of the rolls throughout the lower halves thereof. The bisected chains next pass upwardly over a second pair of angularly disposed rolls 63 which serve to reposition the bisected chains into parallelism with the path which they followed before engaging the spreading rolls 62. However, the bisected chains have been spread and now travel in a different horizontal plane. Further, the two chains have been positioned in the desired spaced relation with respect to each other.

At this point an additional elongated strip or chaining means may be provided to connect together the bisected halves of the chains. For this purpose Fig. 2 shows a supply roll 64 of elongated strip material from which an elongated strip S-4 may be withdrawn and fed over a guide roll 65 and around the periphery of a roll 66 which may be provided with a plurality of spaced heated segments or sections 67 to activate a thermoplastic adhesive coating on the elongated strip S-4 so that the strip S-4 may be adhesively secured to each of the cut lengths of tubing in the chains. The strip S-4 passes from the heated roll 66 and is applied to the spread edge portions of the bisected halves of the chain by a pair of driven rollers 68. The elongated strip S-4 is centrally applied and is of sufficient width that it overlaps the spaced edge portions of the bisected chain and is adhered to each of the lengths of tubing in each of the halves of the bisected chain.

To provide accurate registry in feeding the completed chain the chaining means may be provided with perforations or other suitable registry indicia in the space between adjacent enwrapments. If apertures are provided in one or more of the chaining means, the chain may be advanced in accurate register by a device such as a star wheel or the like having portions which engage the apertures in the chaining means. The registry indicia may be formed in the chaining means in many ways. The drawings show the heating roll 66 (Fig. 2) which feeds the strip or tape S-4 as provided with punch elements or perforators 72 which cooperate with complementary recesses 73 in the periphery of the roll 65 to form perforations along the center line of the strip or tape S-4 between adjacent enwrapments. These perforations are indicated by the numeral 74 in Fig. 1.

The resultant chain is a plurality of spaced pairs of cut lengths of tubing which are connected by the elongated strip S-4 secured to a side wall of each length of tubing at its open end with the bisected halves of the elongated strip S-2 secured to the opposite side walls of the tubing and disposed flush with the open ends of the tubing. The opposite ends of each length of tubing are sealed by the folded over elongated strips S-1 and S-3. If the strip S-4 is doubled back upon itself the result produced is a chain of pairs of enwrapments as shown in Fig. 21 of my copending application Apparatus for and Process of Manufacturing Enwrapments, Serial No. 41,384 filed July 29, 1948, now Patent No. 2,626,544, except that in that figure the bisected halves of the chain are not spaced apart on the connecting V-tape.

The completed chain of pairs of enwrapments may then pass under a guide roller 70 and be coiled or wound in a roll indicated by the numeral 71 in Figs. 1 and 2. In this condition the chain is ready for sale as an article of commerce and may be utilized for packaging. The use of a similar chain is illustrated in my copending application, Serial No. 41,497, filed July 30, 1948, and entitled Bag Filling Machines.

While Figs. 1 through 5 illustrate the combining of lengths of tubing adapted to form a pair of tubular enwrapments, it will be obvious that many other feeding mechanisms may be employed, dependent upon the circumstances and the chain or series of enwrapments which it is desired to fabricate. By way of example, completely fabricated enwrapments such as bags or envelopes may be individually fed from suitable sources of supply, such as stacks, to the assembly point or where a chain of pairs of enwrapments is desired, enwrapments may be fed from both sides of the assembly point. In addition, it is contemplated that enwrapments may be formed or fabricated while being advanced from a source of supply to the assembly point.

From the standpoint of efficiency and decreased cost of production, it is also believed preferable, wherever possible, to chain multiple lengths of enwrapments which may then be severed into the desired size for use. For example, Figs. 5 and 6 illustrate a modified form of enwrapment which may be assembled into a chain or chains in accordance with the present invention. The chains illustrated in Figs. 15 and 16 of said application may be readily fabricated by the use of the present invention. The material from which the wrapper is to be formed may be withdrawn from a supply roll as a flat web and fed through a forming mechanism similar to that utilized in conventional bag-making machinery for forming flat tubing or gusseted tubing in the manufacture of bags. It will be noted that for the instant wrapper a closed tubing is not formed but rather a pleated wrapper.

When the wrapper has been formed it may be fed through rolls similar to the feed rolls 4 and advanced onto a carriage or belt conveyor as shown in Figs. 2, 3, and 4. The length of the formed wrapper cut may be any desired multiple of the length required for a single wrapper. For ease of illustration, Fig. 5 shows a chain formed of a double length of wrapper and three elongated strips S–5, S–6 and S–7 are utilized as the chaining means. It may be noted that the elongated strips S–5 and S–7 are applied so that their outside edges are flush with the multiple length of the formed wrapper. The elongated strip S–6 may be double the width of the strips S–5 and S–7 and is applied so that its center line is in alignment with the center line of the double length of the wrapper. After the wrappers have been chained, the strip S–6 may be slit along its center line together with the wrappers which it chains and the multiplicity of chains thus formed may be individually rolled on separate cores or mandrels. To permit accurate registry in feeding such chains, the chaining means may be provided with registry indicia such as the perforations 80 in the elongated strips S–5, S–6, and S–7. These perforations may be formed in the elongated strips by providing perforators on either the feed rollers 26 or 27. The elongated strip S–6 may be provided with pairs of perforations so that when it is slit there will be a perforation in each half of the tape and when the chain is utilized it may be indexed along each side edge to insure that it is in proper alignment.

In addition to fabricating an enwrapment while it is being fed to the assembly point for chaining, additional operations may be carried out without detracting from the assembling of the enwrapment into one or more chains in accordance with the present invention. For example, reinforcing strips or tabs may be secured to the enwrapment at suitable locations whether the enwrapment is formed from a web or from tubing to facilitate the formation of a pouring spout for the completed package. Where an enwrapment having gussets or infolds is being fabricated, the strips or tabs may be secured to the wall portions of the gussets or infolds adjacent the mouth of the enwrapment and if coated on their exterior surface with a thermoplastic adhesive, the sealing of the enwrapment mouth may also accomplish a sealing together of the gusset walls to provide an excellent siftproof seal.

In the case of the wrapper shown in Figs. 5 and 6, it may be desirable to apply spots, stripes or areas of an adhesive substance to the walls of the pleats or infolds so that they may be detachably secured together while they are being advanced and prior to distending the pleated wrapper. The application of a suitable adhesive may be done during or prior to formation of the wrapper and the adhering together of the infolded portions may be accomplished during formation of the wrapper or might be done concurrently with the assembling of the wrappers into a chain.

It may be noted that in the case of the chain of enwrapments illustrated in Figs. 5 and 6, that it is not necessary to spread the chains after slitting since it is contemplated that, as previously described, the chains will be separately wound or rolled.

Fig. 7 illustrates in perspective a chain similar to that fabricated in Figs. 1 through 4 with the exception that each of the unit tubing lengths may have superimposed thereon, a collapsed, partially collapsed, or folded carton or frame as indicated by the numeral 81. These frames or cartons may be assembled around the enwrapments at any convenient point in the assembling operation. It is contemplated that the frames may be fed as flat sheets and formed around the enwrapment. This may be done as the enwrapment is fed to the assembly point and if portions of the frame or carton are provided with a suitable thermoplastic adhesive the longitudinal seam thereof may be made by the application of heat and pressure as the combined enwrapment progresses.

When the enwrapments of the chain are being utilized for packaging, the carton may be erected and serves as a protection or reinforcement for the enwrapment and its contents. After the enwrapment has been filled and sealed, its end portions may be folded over within the carton or frame and end flaps 82 thereof overlapped and secured together by adhesive or by a sealing strip or otherwise to protectively enclose the enwrapment within the carton. The chaining means may be utilized to assist in the sealing of the end portions of the enwrapment. Also, if the individual packages are separated from the chain by severing the chaining means between individual enwrapment, the portions of the tape extending between adjacent enwrapments may be utilized to adhere the end portions of the enwrapment to the carton, in which case end flaps for the carton may not be required (see Vogt Patent No. 2,180,841). Where the chaining means are not removed from the enwrapments they may be printed with advertising material or serve as labels for the packages.

In this same connection Figs. 1 through 4 of the drawings illustrate the elongated strips S–1 and S–3 as being folded at their midline and the two halves thereof secured to opposite walls of an end portion of the tubing to effect an end seal for the enwrapment. It may be desirable to fold these strips along a line to either side of the midline to provide a free edge portion of the strip or tape which need not be secured to the enwrapment but might be used to secure the end portion of the enwrapment to a portion of a protective carton such as an end flap 82 of the carton 81 as shown in Fig. 7. This is considered advantageous in connection with enwrapments which are disposed within cartons as by so doing it may be possible to remove the load placed on the end seal of the enwrapment by the commodity packaged therein to provide a package with a decreased tendency to become unsealed.

Although Fig. 7 shows a pair of individual cartons enclosing a double length of tubing it will be obvious that the present invention may be utilized to assemble into a chain, an enwrapment which comprises a double length of tubing enclosed within or partly supported or reinforced by a carton or frame which is also of double length. The carton or frame may be slit at the same time that the tubing length is slit by the cutter 61. These single chains or series may then be stacked or manifolded for storage or shipment, ready for advancement to a filling station. If it be desired to combine the individual chains into a connected pair of spaced chains such as by the use of an elongated strip (similar to the tape S–4 in Figs.

1 and 2) this may be readily done by bending the opposed edge portions of the individual chains upwardly or downwardly at an angle to the balance of the chains. A connecting strip folded along its longitudinal center line to a U- or V-shaped configuration and having its margins substantially parallel to the spread edge portions of the chains may then be applied and secured thereto.

The connecting strip or tape may be advantageously secured to the end portions of the cartons or frames or to end flaps thereof rather than being secured to the bag or liner enclosed within the frame. In Fig. 7, the connecting tape S-6 has been secured to the edges of the flattened tubular enwrapment. After the connecting tape has been secured to the angularly disposed margins of the chains it may be flattened from its U- or V-shaped configuration and the chains will be spaced as shown in Fig. 7.

It is believed to be especially advantageous to utilize as chaining means a strip material or tapes either continuously coated with a thermoplastic adhesive material or having spaced areas of such a coating. Such a chaining means permits a secure but detachable connection which may be located as desired by the size and disposition of the heating elements used to activate the adhesive.

Thermoplastic adhesives of the delayed action type may be used to advantage. This means that the adhesive will remain tacky for an appreciable period of time after it has been activated by heat and even though the adhesive may have cooled to a point below its activation temperature. With such an adhesive the location of the activating heaters may be spaced from the point where the elongated strip material is applied. For example, in Fig. 2 the roll 66, where the adhesive on the strip S-4 is activated, is spaced from the rolls 68 which apply the strip S-4. Under other circumstances, it may be equally desirable to utilize a thermoplastic adhesive which requires the simultaneous application of heat and pressure or pressure alone to cause adherence.

Further, suitable thermoplastic adhesives permit a ready removal of the elongated strip material where its presence during or after packaging is not desired or when it is desired to remove enwrapments from the chain. It is only necessary to reactivate the thermoplastic adhesive by the application of heat and the elongated strip may be readily peeled or slipped from the enwrapment to which it has been adhered.

It is also beneficial to be able to control the size and location of the area of adherence. For example, when an enwrapment such as a tubing having infolds or gussets is being chained for packaging, the end of the tubing which will become the mouth of the bag or enwrapment may have elongated strip material adhered thereto completely along opposed sidewalls. Due to the gussets or infolds the enwrapment will be readily openable for filling when the strips or tapes on the opposite sides of the mouth are separated. In the case of a flat tubular enwrapment, however, if the elongated strips are adhered completely along the end or mouth of the enwrapment, separation of the elongated strips adhered to the two sidewalls will not permit a sufficient opening of the mouth for filling. In such case, the activated area of the adhesive on the strip may be lessened so that the strip is only secured to the enwrapment at its central portions. In the form of invention shown in Figs. 1 through 4 this may be determined by the size and shape of the heating elements in the members 35.

For some materials it may be preferable to combine the tapes and enwrapments with an adhesive other than a thermoplastic adhesive, such as a thermosetting adhesive, or an adhesive which requires no heat and which will not soften if heated. By way of example, the chaining means may have applied thereto a conventional adhesive or glue used in the manufacture of bags. Such adhesives are generally applied in a manner similar to printing, to facilitate control of the extent and location of the adhesive area.

Depending upon the adhesion desired, the adhesive may be applied in spots, stripes or other desired shapes or areas and may be applied to the chaining means or to the enwrapments themselves. In the apparatus shown in the drawings, this may readily be done by locating conventional adhesive applying rolls in the region of or in lieu of the rollers 27 shown in Fig. 2. Further, in such case it may not be necessary to utilize the heaters in the members 35.

As another alternative, it has been found that an adhesive not affected or activated by heat may be used to advantage in combination with a thermoplastic adhesive. Such an adhesive may be overprinted without appreciable ill effect, on the chaining means which has already been provided with a coating of a thermoplastic adhesive. Then, the adhesive not affected by heat may be utilized to adhere the chaining means to the enwrapment and when the chaining means is left on the enwrapment to be used as a sealing strip the thermoplastic adhesive may be activated for sealing purposes. Also, in the case of certain of the materials used for making enwrapments a thermoplastic adhesive may not be compatible with such material or may not securely bond thereto. For example, polyethylene, a thermoplastic film, which is not readily laminable below its melting point, may be secured to the chaining means by the use of an adhesive which may be applied to the polyethylene surface or to the chaining means even if the chaining means has a coating of a thermoplastic adhesive. An example of such an adhesive is manufactured by the B B Chemical Company, Cambridge, Mass., and sold under the name "#701." This adhesive provides excellent bonding to polyethylene surfaces and if later the same or adjacent surfaces are heated to the melting point or welding point of the film, the bond is not noticeably affected.

Similarly, when the enwrapment comprises a bag or liner enclosed within a carton or frame, it may be desirable to secure the bag or liner to the frame and again this may be done by coating either the enwrapment or the frame with a suitable adhesive which may or may not be of a type requiring heat for activation. If desired, lines, spots or areas of adhesive may be applied to the frame while it is being fabricated. It may be convenient to apply such adhesive during formation of the carton or frame and at the same time that adhesives are applied to flaps or other portions of the carton to secure the carton together or to permit sealing of the carton.

As may be seen in Fig. 4 the elongated strips S-1 and S-3 may be adhered to the enwrapments throughout the area indicated by the numeral 83. This is sufficient for securing the enwrapment to the strips to permit subsequent handling of the chain. In the instant showing this area of adherence is not particularly important in view of the fact that the strips S-1 and S-3 are to be folded over the ends of the enwrapments by the folders 55 and the heaters 56 activate the thermoplastic adhesive on the elongated strip completely across the end portion of the enwrapment.

The numeral 84 indicates the area of adherence of the elongated strip S-2 to the enwrapment and this area is similar to the area 83 except that it may be of approximately double the width. Then, when the enwrapments and strip S-2 are slit by the cutter 61, it may be seen that the bisected halves of the strip S-2 are adhered to the enwrapment only at the central portion thereof and when, during packaging, these halves are separated while the strip S-4 remains fixed, the end portions of the tubing which comprises the mouth of the bag or enwrapment will be opened to permit filling of the enwrapment with the commodity to be packaged.

It will be obvious that many other variations and modifications from those shown and described for purposes of explanation and illustration may be made without departing from the spirit of the present invention.

What I claim is:

1. The method of assembling enwrapments, which comprises successively supplying pairs of connected enwrapments, securing chaining means to a plurality of said pairs of enwrapments along the connection between said pairs of enwrapments, severing said chaining means and pairs of connected enwrapments forming two separate chains of enwrapments, separating said severed chains of enwrapments, and securing additional chaining means to said separated chains of enwrapments thereby connecting said severed chains to form a chain of spaced pairs of enwrapments.

2. The method of assembling enwrapments into a chain or sequence which comprises advancing a pair of connected enwrapments to a predetermined position, securing an elongated strip to portions of said enwrapments along the line of connection between said enwrapments, severing said strip and said pair of connected enwrapments along said line of connection, separating said severed enwrapments and strip, and connecting said spaced chains of enwrapments by a chaining means extending parallel to said elongated strip.

3. The method of assembling enwrapments into a sequence or chain which comprises advancing a pair of connected enwrapments to a predetermined position, securing an elongated strip to faces of said enwrapments along the common boundary therebetween, severing said strip and pair of enwrapments along the common boundary between said pair of enwrapments to provide two chains of enwrapments, and securing a second elongated strip to faces of said enwrapments opposite to those along which the first mentioned strip is secured, said second elongated strip extending along the line of severance of said two chains of enwrapments.

4. The method of assembling enwrapments into a sequence or chain which comprises advancing a multiple length of connected enwrapments to a predetermined position, advancing chaining means adjacent said predetermined position, securing at least one chaining means along transverse portions of each of said connected enwrapments along the common boundary line between adjacent enwrapments, advancing said chaining means and connected enwrapments from said predetermined position, securing additional multiple lengths of enwrapments to said chaining means with said chaining means extending along the common boundary between adjacent enwrapments, and severing said multiple lengths of enwrapments along the common boundary between adjacent enwrapments to provide a plurality of sequences of individual enwrapments connected in sequence by said chaining means.

5. The method of assembling enwrapments into a sequence or chain which comprises advancing a multiple length of connected unit enwrapments to a predetermined position, advancing chaining means adjacent the predetermined position, successively securing a plurality of said multiple length enwrapments into a sequence by said chaining means with said chaining means extending transversely of said multiple length enwrapments, severing said multiple lengths of enwrapments into unit enwrapments along the common boundary between adjacent connected enwrapments, and reconnecting said severed chains in pairs by an additional chaining means extending transversely of said enwrapments and disposed along the line of severance between adjacent chains of unit enwrapments.

6. This method of assembling enwrapments into a sequence or chain which comprises advancing a multiple length of connected unit enwrapments to a predetermined position, advancing chaining means adjacent the predetermined position, successively securing a plurality of said multiple length enwrapments into a sequence by said chaining means with said chaining means extending transversely of said multiple length enwrapments, severing said multiple lengths of enwrapments into unit enwrapments along the common boundary between adjacent connected enwrapments, positioning said severed chains of unit enwrapments in spaced relation with each other, and reconnecting said severed chains in pairs by an additional chaining means extending transversely of said enwrapments and disposed along the line of severance between adjacent chains of unit enwrapments.

7. The method of producing a chain of enwrapments which comprises successively advancing multiple lengths of tubing to a predetermined position, advancing chaining means transversely of said multiple lengths of tubing, successively securing said multiple lengths of tubing in spaced relation by said chaining means, severing said multiple lengths of tubing into unit lengths, sealing an end of each of said unit lengths of tubing, and applying additional chaining means to unit lengths of tubing to provide a chain of connected pairs of tubing having an end of each unit length of tubing sealed to provide a receptacle.

8. The method of producing a sequence of pairs of bags which comprises advancing double lengths of tubing to a predetermined position, securing an elongated strip to said tubing in a direction transversely of the axis of said tubing and in the region of the central portion of said tubing, securing additional double lengths of tubing to said elongated strip at spaced intervals therealong, bisecting said strip in a longitudinal direction and conjointly bisecting said double lengths of tubing, reconnecting said bisected strips and tubing lengths by a second elongated strip secured to and extending along opposite faces of said tubing lengths along said line of severance.

9. The method in accordance with claim 8, in which elongated strips are applied to opposite free ends of each of said double lengths of tubing and utilized in sealing said ends of said tubing.

10. Apparatus for assembling enwrapments into a sequence which comprises a feed mechanism for advancing multiple lengths of connected enwrapments to a predetermined position, a second feed mechanism for advancing an elongated strip transversely of said multiple length enwrapments, means for successively securing said enwrapments to said elongated strip with said strip extending along the line of connection between adjacent enwrapments of a multiple length, and a cutter for severing said elongated strips in a longitudinal direction and conjointly severing the connection between adjacent enwrapments of said multiple lengths.

11. Apparatus for assembling enwrapments into a sequence which comprises a feed mechanism for advancing multiple lengths of connected enwrapments to a predetermined position, a second feed mechanism for advancing an elongated strip transversely of said multiple length enwrapments, means for successively securing said enwrapments to said elongated strip with said strip extending along the line of connection between adjacent enwrapments of a multiple length, a cutter for severing said elongated strips in a longitudinal direction and conjointly severing the connection between adjacent enwrapments of said multiple lengths, mechanism for positioning said chains of severed enwrapments in spaced relation with respect to each other, and means for applying additional chaining means to reconnect said severed chains of enwrapments while held in spaced relation.

12. A method for assembling enwrapments into a sequence comprising advancing multiple lengths of connected enwrapments successively to a predetermined position, advancing an elongated strip to position it transversely of the multiple length enwrapments at said predetermined position, successively securing the enwrapments to said elongated strip with the strip extending along the line of connection between the enwrapments of a multiple length of connected enwrapments, and cutting through the elongated strip longitudinally and the multiple lengths of enwrapments along said line of connection between said enwrapments.

References Cited in the file of this patent

UNITED STATES PATENTS

| Number | Name | Date |
|---|---|---|
| 2,013,844 | Sherman | Sept. 10, 1935 |
| 2,028,341 | Masterson | Jan. 21, 1936 |
| 2,116,995 | Bickford | May 10, 1938 |
| 2,164,935 | Meyer | July 4, 1939 |
| 2,177,117 | Potdevin | Oct. 24, 1939 |
| 2,363,417 | Heywood | Nov. 21, 1944 |

FOREIGN PATENTS

| Number | Country | Date |
|---|---|---|
| 437,881 | Great Britain | Nov. 6, 1935 |